United States Patent [19]

Brown

[11] 4,096,666

[45] Jun. 27, 1978

[54] ROTARY SEALS

[75] Inventor: David Brown, Stevenage, England

[73] Assignee: Osro Limited, Hemel Hempstead, England

[21] Appl. No.: 764,988

[22] Filed: Feb. 2, 1977

[30] Foreign Application Priority Data

Feb. 9, 1976 United Kingdom ................. 5021/76
Jun. 2, 1976 United Kingdom ............... 22842/76

[51] Int. Cl.[2] ........................ B24B 31/10; F16J 15/40
[52] U.S. Cl. ........................................ 51/7; 51/164 R; 241/66; 241/170; 277/74; 366/174
[58] Field of Search ................. 51/7, 17, 164; 241/66, 241/170, 179, 284; 259/103, 110; 277/74, 15

[56] References Cited

U.S. PATENT DOCUMENTS

| | | | |
|---|---|---|---|
| 3,452,839 | 7/1969 | Swearingen | 277/15 X |
| 3,806,135 | 4/1974 | Wiese | 277/15 |

FOREIGN PATENT DOCUMENTS

| | | | |
|---|---|---|---|
| 1,166,864 | 10/1969 | United Kingdom | 51/7 |
| 905,650 | 9/1962 | United Kingdom | 277/15 |
| 452,481 | 4/1975 | U.S.S.R. | 51/7 |

*Primary Examiner*—Gary L. Smith
*Attorney, Agent, or Firm*—Brisebois & Kruger

[57] ABSTRACT

An abrasive finishing machine comprising a cylindrical tub and a rotating base has annular sealing members attached to the tub and base of which the stationary sealing member is formed with axial ports for the injection of cooling fluid under pressure to cool and lubricate the rubbing surfaces and to wash intruding particles back into the tub.

3 Claims, 1 Drawing Figure

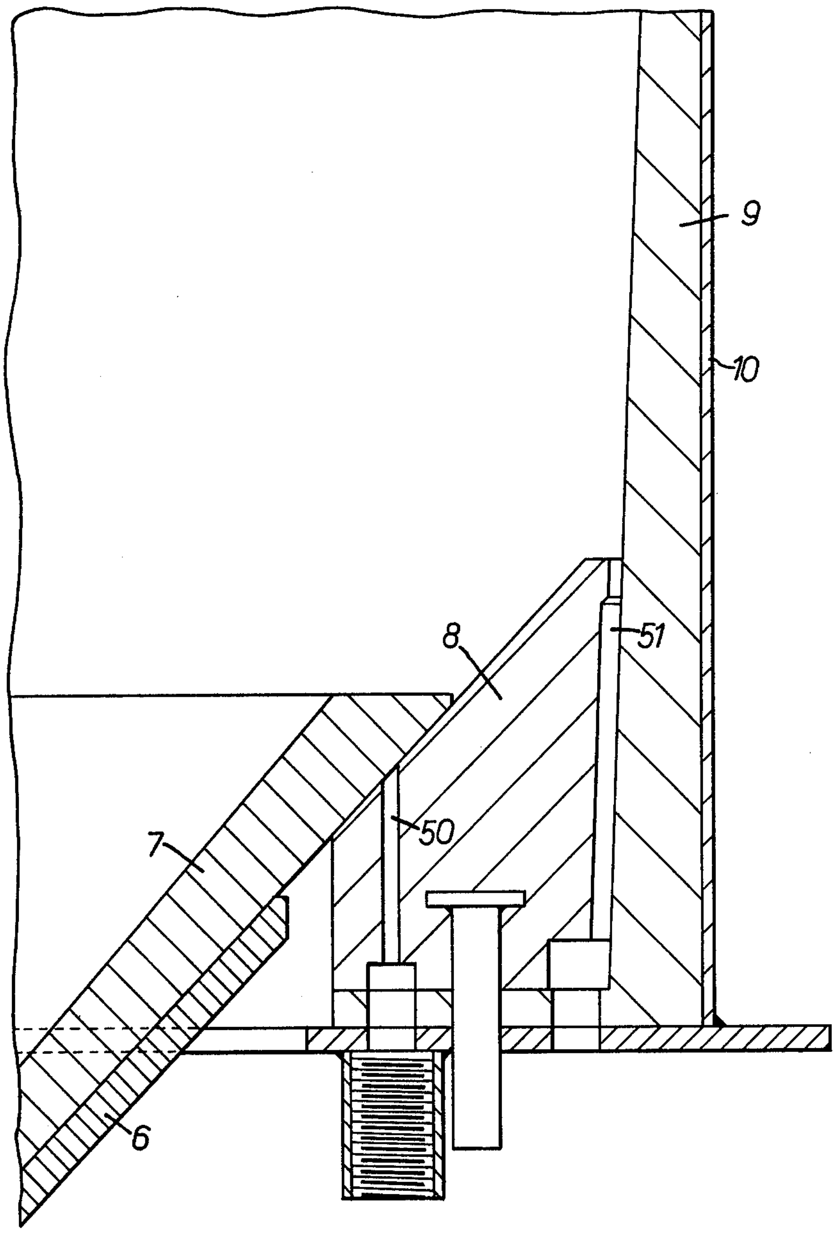
9
10
8
51
50
7
6

ROTARY SEALS

This invention relates to abrasive surface finishing machines, in which surface finishing of workpiece is effected by immersing the workpiece in a mass of lubricated abrasive media and subjecting the workpieces to movement relative to the mass. Such machines are well known in themselves and are employed for surface treatments such as de-burning of machined workpieces, de-flashing mouldings and polishing of machine or cast surfaces.

As an example of such machines, reference may be made to British patent specification No. 1,166,864, which describes and shows machines having a stationary tub of generally cylindrical form and a rotary base, the tub and base having respective sealing members in mutual frictional contact. One or both the sealing members may be of resiliently flexible material.

The above mentioned Patent Specification mentions the possibility of feeding liquid to the interior of the tub through a gap left between the rotary base and the tub, e.g. by adapting the rotary base to act as a pump impeller. What is contemplated in that case is a relatively large flow rate with a low pressure drop around the whole periphery of the members bordering the gap, which is not, in any event, a sealed gap. Such a construction brings its own complications by virtue of the modification required in the rotary base, and is only appropriate for operations in which a high degree of flooding of the media is acceptable.

The sealing surfaces of the sealing members in such a machine are liable in use to overheating due to the high frictional forces which tend to be generated, and also to surface abrasion by fragments of solid material entering between the sealing surfaces. These fragments may be comminuted particles from the abrasive media or fragments broken away from workpieces by the media.

The present invention aims at solving these problems in a simple but effective manner and resides broadly in providing the tub sealing member with a plurality of ports through it for the injection of a pressurised fluid coolant between the sealing surfaces of the sealing members, which surfaces are arranged to direct the injected coolant to the interior of the tub.

Preferably, the sealing surfaces are of frusto-conical form and the ports are directed substantially axially. A frusto-conical form is advantageous because of the ease with which good bearing engagement between the sealing surfaces can be obtained by axial adjustment of the base relative to the tub. It is then only necessary to direct the injected fluid substantially axially to ensure that the fluid is deflected radially by the confronting frusto-conical surface.

Air or other gas can be employed in some cases, but generally it is preferred to use a liquid coolant, in which case a plurality of drain holes can be provided downstream of the ports and the periphery of the rotary sealing member, so as to drain off coolant which has passed through the ports and between the sealing surfaces of the sealing member.

One form of surface finishing machine in accordance with the present invention will now be described, by way of example, with reference to the accompanying drawing, which is a scrap axial section at the periphery of the chamber of a surface treatment machine.

The machine illustrated is of the same gereral construction as that described and shown in British patent specification No. 1,166,864, and the FIGURE corresponds generally with FIGS. 2 to 5 of that Specification.

The machine again comprises a bowl 6 having a lining 7 the edge of which bears sealingly against an angled face of an annular support ring 8 secured to the lining 9 of tub 10. The ring 8 has a number of axial holes 50 through it for the injection of water or other suitable liquid coolant, and at the inner periphery of the tub a number of drain holes 51.

In use, liquid coolant is injectecd through the holes 50 under high pressure and forces its way between the sealing surfaces of the lining 7 and ring 8 in an upward and (being so deflected by the lower face of the lining 7) radially outward direction, thus cooling the rubbing surfaces and also inhibiting the ingress of solid fragments between the surfaces. The coolant is drained off through the holes 51.

The lining 7 and ring 8 may be of polyurethane, or the ring 8 could be of steel or other metal.

Typically, liquid coolant may be injected at pressures of up to 75 p.s.i. at flow rates in the range 5 to 50 gallons per minute. More particularly, we may employ pressures of 10 to 15 p.s.i. at a flow rate of about 5 gallons per minute.

In a modification air or other gas is employed in place of liquid coolant.

This modification is of particular value when the machine is employed for the comminution and/or mixing of powdery materials. The air or other gas may be blown through oil for the purpose of introducing very small quantities of oil to act as a lubricant between the sealing surfaces.

I claim:

1. An abrasive, surface finishing machine comprising a stationary tub of generally cylindrical form and a rotary base, said tub and base having respective annular sealing members in mutual frictional contact, at least one of said members being of resiliently flexible material, and wherein the tub sealing member has a means defining a plurality of ports through it for the injection of a pressurised fluid coolant between the contacting, sealing surfaces of said sealing members, which surfaces are arranged to direct the injected coolant to the interior of said tub.

2. A surface finishing machine according to claim 1, wherein said sealing surfaces of the said members are of frusto-conical form, and said ports are directed substantially axially.

3. A surface finishing machine according to claim 1, including means defining a plurality of drain holes downstream of said ports and of a periphery of said rotary sealing member, to drain off liquid coolant which has passed through said ports and between said sealing surfaces of said sealing members.

* * * * *